UNITED STATES PATENT OFFICE.

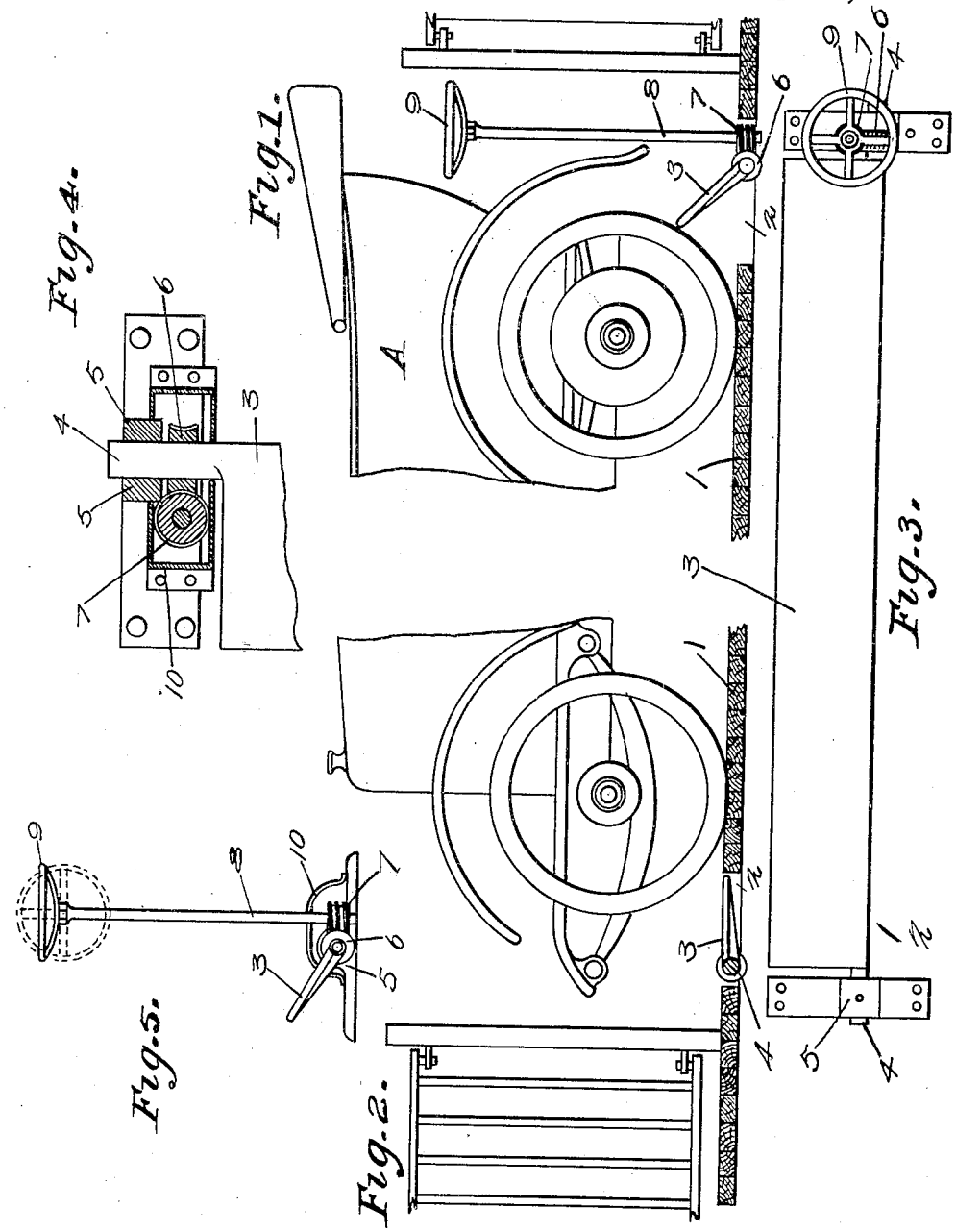

COLLINS P. READ, OF NEWARK, NEW JERSEY.

SAFETY-CHOCK.

1,336,442.  Specification of Letters Patent.  Patented Apr. 13, 1920.

Application filed October 14, 1919. Serial No. 330,611.

*To all whom it may concern:*

Be it known that I, COLLINS P. READ, a citizen of the United States, residing at 382 Lafayette St., Newark, in the county of Essex and State of New Jersey, have invented a new and useful Safety-Chock, of which the following is a specification.

This invention relates to a safety chock for use on ferry boats and other structures for the purpose of preventing vehicles from driving past a predetermined line until released by an authorized person, thereby preventing accidents such as sometimes occur due to accidental or premature movement of a vehicle forwardly or backwardly before the way is prepared for its passage.

With the foregoing and other objects in view, which will appear as the description proceeds, the invention consists of certain novel details of construction and combinations of parts which will be hereinafter more fully described and pointed out in the claims it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Figure 1 is a section through a portion of a structure having the present invention applied thereto and positioned to hold a vehicle against movement.

Fig. 2 is a similar view showing the structure with the chock arranged to allow passage of a vehicle.

Fig. 3 is a plan view of the chock.

Fig. 4 is a section through the chock operating mechanism.

Fig. 5 is an elevation of said mechanism.

Referring to the figures by characters of reference, 1 designates a portion of the deck of a boat or any other structure over which vehicles A are to be driven. Arranged in this structure is a transverse opening or recess 2 in which is arranged a strip 3 constituting the body portion of the chock and from the ends of which extend trunnions 4 journaled in bearings 5. To one of these trunnions is secured a worm gear 6 meshing with a worm 7 secured to an upstanding shaft 8 carrying a hand wheel 9. The worm 7 and gear 6 can be located in a protecting housing 10 and, as shown in said figure, the hand wheel 9 can, when not in use, be swung to a vertical position where it is out of the way.

Under normal conditions the strip 3 is lowered into its recess 2 and a vehicle A can be driven back and forth over it. When it is desired to prevent the passage of a vehicle, however, the strip 3 can be swung up to stopping position merely by rotating the hand wheel 9. The worm 7 and gear 6 will coöperate to hold the strip in raised position and it cannot be lowered except by rotating the hand wheel.

It will be apparent that a device such as described is particularly useful in connection with ferry boats, draw bridges, and the like and by means thereof a vehicle can be held against movement until the chock strip 3 is lowered by an authorized person.

What is claimed is:—

1. A vehicle chock including a strip adapted to extend across the path of a vehicle, an operating shaft, worm gearing for transmitting motion from said shaft to the strip to swing the strip upwardly and downwardly into and out of the paths of the wheels of the vehicle.

2. The combination with a structure having a transverse recess across the path of a vehicle, of a strip normally housed in the recess, an operating shaft, gearing connecting said shaft to the strip, and means for operating the shaft to swing the strip out of the recess and into the path of a vehicle and downwardly into the recess out of said path to form a part of the road bed for the vehicle.

3. The combination with a structure having a recess across the path of a vehicle movable along the structure, of a strip normally mounted in said recess to form a part of the road bed, bearings at the ends of the recess, trunnions upon the strip and in the bearings, an operating shaft at one end of the shaft, worm gearing for transmitting motion from said shaft to the strip to swing the strip out or into the recess and to hold the strip against movement when subjected to pressure.

In testimony that I claim the foregoing as my own, I have hereto affixed my signature in the presence of two witnesses.

COLLINS P. READ. [L. S.]

Witnesses:
SADIE FORMAN,
DAVID D. FORMAN.